(12) United States Patent
Bublitz et al.

(10) Patent No.: US 6,219,651 B1
(45) Date of Patent: Apr. 17, 2001

(54) PROTECTION OF TRANSACTION DATA

(75) Inventors: Hermann Bublitz, Alicante (ES); Chris Holloway, Woking; Adam Newth, London, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,581

(22) Filed: Dec. 18, 1998

(30) Foreign Application Priority Data

Dec. 23, 1997 (DE) .............................................. 197 57 501

(51) Int. Cl.⁷ ...................................................... G06F 17/60
(52) U.S. Cl. ................................... 705/40; 705/1; 705/39
(58) Field of Search ................................... 705/1, 10, 13, 705/17, 67, 40, 39, 44, 65; 235/379; 380/30, 23

(56) References Cited

U.S. PATENT DOCUMENTS 5,770,844 * 6/1998 Henn ..................................... 235/380
5,796,831 * 8/1998 Paradinas et al. ...................... 380/24

FOREIGN PATENT DOCUMENTS

2287565 * 9/1995 (GB) .

OTHER PUBLICATIONS

COMLINE–Telecommunications, IC card system for Commerical Transaction Security, PP 1, May 1996.*
John Parry, Show to Introduce New Products, PP 1–2, Jul. 1994.*
Business wire, Visa International certifies the Intellect, PP 1, Nov. 1996.*
Business Wire, ACT's Internet Suite, PP 1, Dec. 1998.*
Malayan Banking, ATM network for integration, PP 1, Jun. 1996.*
Computergram International, Siemens has security, PP 1, May 1996.*

* cited by examiner

*Primary Examiner*—James P. Trammell
*Assistant Examiner*—Mussie Tesfamariam
(74) *Attorney, Agent, or Firm*—Thomas A. Beck; Daniel P. Morris

(57) ABSTRACT

The invention presented describes the protection of transaction data in cash-free payment traffic from its creation to its processing by means of stock-exchange chip cards (4). In each payment transfer, transaction data TDi (10) is created on the individual payment procedure, and cumulative data SD (81) on the payment transactions since the last data exchange with the settlement position are summarized. The transaction data TDi is stored in the payment terminal. The cumulative data SD is stored in the security module. In each payment transaction, the cumulative data is supplemented by the new amount. The cumulative data is stored using a cumulative signature Ssn (82) which is applied to each supplement to the cumulative data. In this, the value of the previous cumulative signature is used as an initial value for the formation of the new cumulative signature. The key of the payment terminal or a separate individual key can be used. The cumulative signature is also stored in the security module. To settle using the settlement position, the cumulative data, the cumulative signature and the transaction data are sent to the settlement position by means of a transaction file (12).

27 Claims, 1 Drawing Sheet

PROTECTION OF TRANSACTION DATA

FIELD OF THE INVENTION

The present invention is directed to the field of protection of transaction data for cash-free payment transfers by means of chip cards, from the data's creation in the payment terminal to its processing.

BACKGROUND OF THE INVENTION

The invention refers to the protection of transaction data for cash-free payment transfers by means of chip cards, from the data's creation in the payment terminal to its processing.

Modern types of cash-free payment transfers are carried out using chip cards. In particular, these are electronic stocks, credit cards and debit cards.

Several different payment transfer applications can exist on a chip card, for example electronic stocks and credit cards.

The chip card is initialized before issue to the customer, i.e. application data and cryptographic keys for securing the transaction are stored on the chip card which allow the chip card to be used within the framework of certain applications. On being issued with the card, the customer is informed of the application for which the chip card can be used.

If a customer wishes to pay for goods at a dealer using his/her stock chip card, then this transaction can be carried out at a payment terminal. The chip card is inserted into a chip card reader arranged in the payment terminal. Using the chip card reader, data can be read from the chip card or data can be written to the chip card. With electronic stock applications, the credit stored on the chip card is reduced by the amount which is to be paid to the dealer for the goods.

To carry out the described payment procedure, the payment terminal has the following components in particular: a chip card reader, a keyboard for entering data, a network and software for controlling the corresponding transactions, a display unit to display instructions to the customer, a security module, and a communication connection to the host system, especially if credit/debit cards are supported.

In general, at each payment transfer, transaction data on the individual payment procedure is created as well as cumulative data which is brought up to date on the transactions which have occurred since the last data exchange with the clearing office.

Amongst other things, the transaction data contains:

The identification of the customer's chip card

The amount, the currency and the bank

The identification of the dealer and the payment terminal and cryptographic security (signature advisable) of the transaction data is advisable with the transaction key of the chip card.

The transaction data is created in a cryptographically secure protocol between the chip card and the security module, using the individual transaction key on the chip card and in the security module. The transaction data is secured using the individual transaction key which is allocated to the chip card.

The transaction data is stored in the payment terminal up until the data exchange with the clearing office.

The cumulative data is held in the security module and is read out on exchanging the data with the clearing office.

Cumulative data includes, for example:

The total amounts of the transactions

The number of transactions

The identification of the dealer and the payment terminal and cryptographic security (signature is advisable) of the cumulative data is advisable using the key allocated to the dealer or the payment terminal in the security module.

On exchanging data with the clearing office, a transaction file is transmitted to the clearing office from the payment. The transaction file consists of Header data, which contains the last cumulative data as well as data specific to the payment terminal and the transaction data of each transaction, if a certain minimum standard of security is required.

The transaction data is individually secured using transaction keys. The transaction key is located on the individual chip card. Transaction keys can be stolen and transaction data can be copied from other payment terminals. Therefore, whilst the transaction data is being stored in the payment terminal and during its transfer to the clearing office, transaction data can be used fraudulently to the benefit/deficit of individual card owners.

SUMMARY OF THE INVENTION

It is therefore the task of the invention presented to produce an additional procedure to protect the transaction data which increases the previous protection against fraud and greatly simplifies obtaining proof of fraud.

This task is solved with the following aspects considered with the figure:

Aspect 1. A procedure for protecting transaction data in cash-free payment traffic by means of an electronic purse cards in a payment terminal, where the payment terminal (1) consists of at least a read/write device (5), an input device (3), at least a security module (8) and a communication module (9) for creating the connection to a data processing system, containing the following steps:

a) Insertion of a stock-exchange chip card (4) in a read and/or write device (5), b) Initiation of a transaction for payment of a certain amount using the stock-exchange card (4)

c) Creation of the corresponding transaction data (10) for that payment procedure, for each payment procedure d) Creation of the corresponding cumulative data (81) for each payment procedure, where the cumulative data includes the transaction data since the last data exchange with the settlement position (11) and e) Creation of a cumulative signature (82) on each supplement to the cumulative data (81), where the new cumulative signature SSi (82) is formed from the initial value of the previous cumulative signature SSi-1 (82).

Aspect 2. A procedure according to aspect 1 characterized by the cumulative data (81) being reset in the security module (8) after a data exchange with the settlement position and an initial value for the creation of the cumulative signature (82) being established.

Aspect 3. A procedure according to aspects 1 to 2, characterized by the transaction data TDi (10) consisting of at least the following data:

the identification of the stock-exchange chip card of the customer the debit amount, the currency, the bank the identification of the dealer and the payment terminal.

Aspect 4. A procedure according to aspects 1 to 3, characterized by the transaction data for the transaction being created in the security module in cooperation with the chip card.

Aspect 5. A procedure according to aspects 1 to 4, characterized by the transaction data created TDi (10) being secured by the stock-exchange chip card key.

Aspect 6. A procedure according to aspects 1 to 5, characterized by the cumulative data SD (81) consisting of at least the following data:
- the cumulative amount of the transactions
- the number of transactions
- the identification of the payment terminal Aspect 7. A procedure according to aspects 1 or 6, characterized by the creation of the cumulative signature (82) being carried out using the cryptographic key allocated to the payment terminal or the dealer.

Aspect 8. A procedure according to aspects 1 to 7, characterized by the transaction data remaining stored in the payment terminal until settlement using the settlement position.

Aspect 9. A procedure according to aspects 1 to 8 characterized by the cumulative data SD (81) being stored in the security module (8) until settlement using the settlement position.

Aspect 10. A procedure according to aspects 1 to 9, characterized by the cumulative signature being stored in the security module until settlement using the settlement position.

Aspect 11. A procedure according to aspects 1 to 10, characterized by the creation of the cumulative signature SS being able to be carried out in symmetrical and asymmetrical procedures.

Aspect 12. A procedure according to aspects 1 to 11, characterized by a special key being used solely for the creation of the cumulative signature SS.

Aspect 13. A procedure according to aspects 1 to 12, characterized by a common key and/or a common transaction file 12 being used for several security modules.

Aspect 14. A procedure according to aspects 1 to 13, characterized by a common device for creating the cumulative signature SS and/or common transaction files being used for several security modules stored on one data carrier.

Aspect 15. A procedure according to aspects 1 to 14, characterized by the following additional steps:
- f) Reading out the cumulative data SD (81) and cumulative signatures SS (82) from the security module (8)
- g) Creation of a transaction file (12) with the following data:
  - aa) Cumulative data SD (81)
  - bb) Cumulative signature SS (82)
  - cc) Transaction data TDi (10)
- h) Transfer of transaction file (12) to the settlement position (11)
- i) Creation of a cumulative signature SS (82) after step e) of the procedure from the transaction data TDi (10) using the key and the allocated initial value
- j) Comparison of the cumulative signature SS (82) created after step i) with the cumulative signatures (82) sent from the security module (8)

Aspect 16. A procedure according to aspect 15, characterized by step g) being initiated either by the payment terminal or by the settlement position.

BRIEF DESCRIPTION OF THE DRAWING

These and other objects, features, and advantages of the present invention will become apparent upon further consideration of the following detailed description of the invention when read in conjunction with the drawing figure which shows an example schematic representation of a payment terminal in accordance with the present invention.

DETAILED DESCRIPTION OF THE INVENTION

Figure 1:
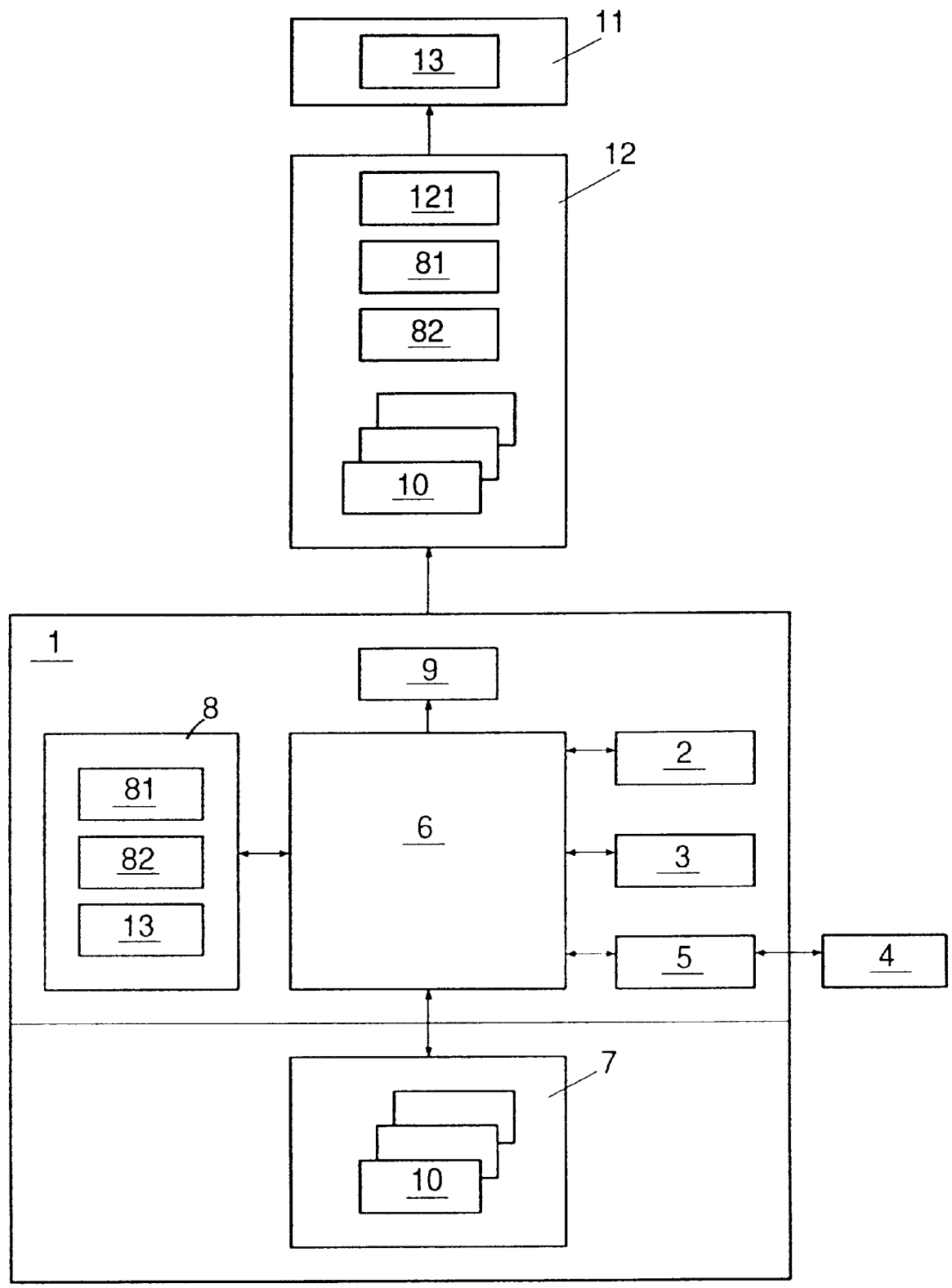

The basic advantage of the invention compared to the current state of the art is that, from its creation in the security module until its processing in the clearing office, all transaction data created in the payment terminal is protected against fraud by means of stolen keys, and against being exchanged for old transaction data or transaction data created elsewhere. In particular, this refers to storage in the payment terminal and the communication between the payment terminal and the clearing office.

In a proper design using the invention, the signature over all transactions, hereinafter called the cumulative signature (SS) is created in the security module (SM) of the payment terminal in the period between two transmissions of the transaction file to the clearing office.

The following steps are carried out:

1. In the security module (SM), the cumulative data is reset and the cumulative signature is set to a fixed value (zero is advisable), which is known to the settlement office. The initial cumulative signature SS becomes the cumulative signature SSO.

2. Per payment transaction i (i=i up to i=n), the following steps are carried out in the payment terminal:
   1) The transaction data (TDi) for the transaction is created.
   2) The cumulative data (SD) is supplemented by the transaction value.
   3) The cumulative signature (SSi) is reformed as follows:
      The previous cumulative signature (SSi-1) is the initial value of the new signature formation
      Using this initial value, a signature is formed over the TDi just created. In this way, the key allocated to the dealer or the payment terminal is used in the SM.
      The new signature is saved in the SM as the SSi.
   4) The cumulative data and the SSi remain in the security module.
   5) The transaction data (TDi) is transferred to the software in the payment terminal. It is saved in the payment terminal or elsewhere until the transaction file is transferred to the clearing office. This stored data is not secured against fraud and mix-ups.

3. A transfer of the transaction file to the clearing office is initiated. This can be done, for example, through the clearing office or the payment terminal.

The following steps are carried out:
   The software of the payment terminal reads the cumulative data (SDn) and the cumulative signature (SSn) from the security module
   A transaction file is also created from data created by the payment terminal, from the cumulative data SDn, the cumulative signature SSn and the transaction data TD1 to TDn, which is stored in the payment terminal or elsewhere.

4. The transaction file is transferred to the clearing office.

5. The clearing office, possessing the key to test the SS, creates a signature from the transaction data TD1-n using the procedure described under 2.3, with the same initial value as used in the payment terminal. If this signature is identical to that sent from the payment terminal, then all transaction data TD1 to TDn are identical to that created in the security module of the payment terminal, i.e. fraud or a mix-up in the payment terminal or during the transmission can be ruled out.

The signature formation in the payment terminal and in the clearing office can be carried out using both symmetric and asymmetric cryptographic procedures.

A useful development of the invention plans for a special key being used solely for securing the transaction data through the SS instead of the key allocated to the dealer or to the payment terminal (for general purposes). This key can be allocated to both the dealer and the payment terminal or to other units.

Several security modules at one dealer can have the same key allocated for forming the SS, for example. These SMs can correspond to a branch, a server or another dealer operating group. This procedure simplifies the administration, the security and the distribution of the key.

Another development of the invention plans for a common device for forming the SS if several security modules are united on one data carrier.

This allows the creation of a SS over different types of transaction data, for example credit cards, debit cards, stocks, and the common transfer to the clearing office. In this way the work required for creating the SS as well as for administering, securing and distributing the key by both the payment terminal as well as in the clearing office is reduced.

The invention presented is described in more detail using a preferred design example, where FIG. 1 shows a schematic representation of a payment terminal. According to FIG. 1, a payment terminal 1 has a display unit 2 and a keyboard 3. Using the display unit 2, the user of the payment terminal 1 is shown information.

This includes, in particular, requests to enter certain information using the keyboard 3.

The payment terminal 1 can be used to give customers of a dealer the opportunity to pay cash-free for goods or services of the dealer, for example within the framework of electronic stock. In this, the payment terminal 1 can be connected on-line to a central network via the host communication module 9 or it can be developed as an offline device.

If a cash-free payment procedure is carried out using the payment terminal 1, then the amount to be paid by the customer, for example, will be displayed on the display unit 2. By means of the keyboard 3, the payment type can be selected and the amount to be paid can be entered and confirmed.

To control the payment terminal 1 when it is being used by the customer, the payment terminal 1 has a terminal module 6 which is basically built as a software module. The terminal module 6 is arranged in the memory of a processing unit of the payment terminal 1 and is used by a processor in the processing unit for executing applications. The terminal module 6 exchanges information with the different components of the payment terminal 1, in particular the display unit 2, the keyboard 3, a card reader 5, a security module 8 and a host communication module 9. For example, the information exchange between the keyboard 3 and the terminal module 6 is used for processing the data entered by the customer using the keyboard 3.

In addition, information is exchanged between the terminal module 6 and the card reader 5, in order to read data from a chip card 4 inserted in the card reader 5, or to write data to the chip card 4.

If a customer wants to pay using his/her electronic stock or another cash-free method of payment which is entered on the chip card 4, then the dealer enters the amount to be paid by means of the keyboard 3. Using the processing unit, the terminal module 6 carries out the procedural steps required for reading the entry.

The terminal module 6 sets the card reader 5 into the state in which it expects the insertion of a chip card.

After the chip card 4 is inserted into the card reader 5 and a correct contact is created between the chip card 4 and the card reader 5, the card reader 5 sends corresponding information to the terminal module 6.

Then a payment transaction has to be carried out within the framework of which the amount to be paid is deducted from the electronic stock on the chip card 4 and the deducted amount as well as other transaction data such as chip card identification, currency and stock owner is stored in the payment terminal 1 so that the dealer can then receive this amount later on from the clearing house of the stock owner.

On carrying out the procedural steps for deducting the amount to be paid from the chip card 4, a security module 8 is used in order to exchange data relevant to security and to prevent misuse of the stock.

In the security module 8 are stored functions and procedures which can be carried out and which are used for carrying out the deduction of the amount to be paid from the electronic stock of the chip card 4, as well as cryptographic keys. In addition, cumulative data on the transactions carried out with the stock owner since the last deduction are kept in the security module. The deduction is initiated by the terminal module 6 and covers information exchange between the chip card 4 and the security module 8. This information exchange has the following step sequence:

1. The transaction data (TDi) 10 for the transaction is created in the security module 8 in cooperation with the chip card 4.
2. The cumulative data (SD) 81 in the security module 8 are supplemented by the transaction value.
3. The cumulative signature 82 in the security module 8 is supplemented as follows:
   The previous cumulative signature (SSi-1) is the initial value of the new signature formation
   Using this initial value, a signature is formed over the TDi already created. In this, the key allocated to the dealer or the payment terminal is used in the SM.
   The new signature is stored in the SM 8 as a cumulative signature SSi 82.
1. The cumulative data 81 and the SSi 82 remain in the security module 8.
2. The transaction data (TDi) 10 are transferred to the terminal software 6. They are stored in a memory 7 in the payment terminal or outside the payment terminal until transfer. This stored data is not secured against fraud or mix-ups.

At the end of the day, or at a time determined by the dealer or the clearing office, the transaction data for deduction is sent to the clearing office 11 of the stock owner.

In this, the following steps are carried out:
The terminal software 6 reads the cumulative data 81 (SDn) and the cumulative signature 82 (SSn) from the security module 8.
A transaction file 12 is created with data 121 created by the payment terminal regarding the transmission and which is not a component of this invention, the cumulative data 81 SDn, the cumulative signature 82 SSn and the transaction data 10 i to n which are stored in the memory 7 of the payment terminal or elsewhere.
The transaction file 12 is transferred to the clearing office 11 by means of the communication module The clearing office 11, possessing the key 13 to test the SS, creates from the transaction data 10 TDi to TDn a signature 82 according to the same procedure used in the security module 8 and with the same initial value as in the payment terminal. If this signature 82 is identical to the signature sent from the payment terminal, then all transactions TD1 to TDn are identical to those created in the security module of the payment terminal, i.e. fraud or mix-ups in the payment terminal or during the transmission can be ruled out.

It is noted that although the description is made for particular arrangements and applications, the intent and concept of the invention is suitable and applicable to other arrangements and applications. For instance, the invention may be implemented as a method, an apparatus and/or a computer device. It will be clear to those skilled in the art that other modifications to the disclosed embodiments can be effected without departing from the spirit and scope of the invention.

What is claimed is:

1. A procedure for protecting transaction data in cash-free payment traffic by means of a chip card in a payment terminal, the procedure comprising:
    a) inserting an electronic purse chip card in a read and/or write device;
    b) initiating a transaction for payment of a certain amount using said electronic purse chip card;
    c) creating corresponding transaction data for a payment procedure, for each said payment procedure;
    d) creating corresponding cumulative data for each said payment procedure, where the cumulative data includes transaction data since a last data exchange with a settlement position, and
    e) creating a cumulative signature on each supplement to said cumulative data, where said new cumulative signature is formed from the initial value of the previous cumulative signature;
    f) resetting the cumulative data in a security module after a data exchange, with the settlement position and an initial value for the creation of the cumulative signature being established.

2. A procedure according to claim 1 further comprising resetting the cumulative data in a security module after a data exchange, with the settlement position and an initial value for the creation of the cumulative signature being established.

3. A procedure according to claim 1, wherein the transaction data includes at least the following data:
    the identification of the stock-exchange chip card of the customer, a debit amount, currency, bank, an identification of a dealer, and the payment terminal.

4. A procedure according to claim 1, wherein the transaction data for the transaction is created in the security module in cooperation with the chip card.

5. A procedure according to claim 1, wherein the transaction data created is secured by a chip card key.

6. A procedure according to claim 1, wherein the cumulative data includes:
    a cumulative amount of all the transactions;
    a number of transactions; and
    an identification of the payment terminal.

7. A procedure according to claim 1, wherein the step of creating a cumulative signature is carried out using a cryptographic key allocated to a payment terminal or to a dealer.

8. A procedure according to claim 1, further comprising storing the transaction data in the payment terminal until settlement using a settlement position.

9. A procedure according to claim 1, further comprising storing the cumulative data in the security module until settlement using a settlement position.

10. A procedure according to claim 1, further comprising storing the cumulative signature in the security module until settlement using a settlement position.

11. A procedure according to claim 1, wherein the step of creating a cumulative signature is able to be carried out in symmetrical and asymmetrical procedures.

12. A procedure according to claim 1, wherein the step of creating a cumulative signature includes employing a special key.

13. A procedure according to claim 1, wherein a common key and/or a common transaction file is used for more than one security module.

14. A procedure according to claim 1, wherein the step of creating a cumulative signature includes employing a common device, and/or common transaction files are used for several security modules stored on a data carrier.

15. A procedure according to claim 1, further comprising:
    f) reading the cumulative data and cumulative signatures from the security module;
    g) creating a transaction file which includes cumulative data, cumulative signature, and transaction data;
    h) transferring the transaction file to the settlement position;
    i) creating a cumulative signature SS (82) after step
    e) from the transaction data using a key and an allocated initial value;
    j) comparing the cumulative signature created after step i) with the cumulative signature sent from the security module.

16. A procedure according to claim 15, wherein step g) is initiated either by the payment terminal or by the settlement position.

17. A payment terminal employing a chip card and protecting transaction data in cash-free payment traffic, the payment terminal comprising:
    an input device to receive the chip card;
    at least one read/write device to read and write data on the chip card;
    at least one security module to maintain security of a transaction; and
    a communication module to create a connection to an external data processing system, wherein:
    a transaction takes place by an insertion of the chip card into the read/write device, an initiation of payment of an amount of money, creation of corresponding transaction data for a payment procedure, wherein each payment procedure includes:
        creation of corresponding cumulative data which includes new transaction data since a last data exchange and a settlement position, and
        creation of a cumulative signature on each supplement to the cumulative data, wherein a new cumulative signature is formed from the initial value of a just previous cumulative signature.

18. A payment terminal according to claim 17, wherein the cumulative data is reset in the security module after a data exchange with the settlement position and an initial value for the creation of the cumulative signature is established.

19. A payment terminal according to claims 17, wherein the transaction data includes an identification of the chip card of a customer, a debit amount, a currency, a bank, an identification of a dealer and the payment terminal.

20. A payment terminal according to claims 17, wherein the transaction data for the transaction is created in the security module in cooperation with the chip card.

21. A payment terminal according to claims 17, wherein the transaction data created is secured by a chip card key.

22. A payment terminal according to claims 17, wherein the cumulative data includes an cumulative amount of all the transactions, a number of transactions, and an identification of the payment terminal.

23. A payment terminal according to claims 17, wherein the creation of the cumulative signature is carried out using a cryptographic key allocated to the payment terminal or a dealer.

24. A program storage device readable by machine, tangibly embodying a program of instructions executable by the machine to perform method steps for protecting transaction data in cash-free payment traffic by means of a chip card in a payment terminal, said method steps comprising:
   a) inserting an electronic purse card in a read and/or write device;
   b) initiating a transaction for payment of a certain amount using said electronic purse card;
   c) creating corresponding transaction data for a payment procedure, for each payment procedure;
   d) creating the corresponding cumulative data for each payment procedure, where the cumulative data includes transaction data since a last data exchange with a settlement position, and;
   e) creating a cumulative signature on each supplement to the cumulative data, where the new cumulative signature is formed from the initial value of the previous cumulative signature.

25. A program storage device readable by machine as recited in claim 24, said method steps further comprising resetting the cumulative data in a security module after a data exchange, with the settlement position and an initial value for the creation of the cumulative signature being established.

26. A program storage device readable by machine as recited in claim 24, said method steps further comprising storing the transaction data in the payment terminal until settlement using a settlement position.

27. A program storage device readable by machine as recited in claim 24, said method steps further comprising:
   f) reading the cumulative data and cumulative signatures from the security module;
   g) creating a transaction file which includes cumulative data, cumulative signature, and transaction data;
   h) transferring the transaction file to the settlement position;
   i) creating a cumulative signature SS (82) after step e) from the transaction data using a key and an allocated initial value;
   j) comparing the cumulative signature created after step i) with the cumulative signature sent from the security module.

* * * * *